US009854046B2

(12) United States Patent
Baudouin et al.

(10) Patent No.: US 9,854,046 B2
(45) Date of Patent: Dec. 26, 2017

(54) METHOD FOR REGISTERING AT LEAST ONE PUBLIC ADDRESS IN AN IMS NETWORK, AND CORRESPONDING APPLICATION

(71) Applicant: GEMALTO SA, Meudon (FR)

(72) Inventors: Julien Baudouin, La Ciotat (FR); Jean-Yves Fine, La Ciotat (FR)

(73) Assignee: GEMALTO SA, Meudon (FR)

( * ) Notice: Subject to any disclaimer, the term of this patent is extended or adjusted under 35 U.S.C. 154(b) by 109 days.

(21) Appl. No.: 14/413,835

(22) PCT Filed: Jul. 11, 2013

(86) PCT No.: PCT/EP2013/064743
§ 371 (c)(1),
(2) Date: Apr. 29, 2015

(87) PCT Pub. No.: WO2014/009502
PCT Pub. Date: Jan. 16, 2014

(65) Prior Publication Data
US 2015/0237148 A1    Aug. 20, 2015

(30) Foreign Application Priority Data
Jul. 12, 2012  (EP) .................................... 12305841

(51) Int. Cl.
*G06F 15/16* (2006.01)
*H04L 29/08* (2006.01)
(Continued)

(52) U.S. Cl.
CPC ............ *H04L 67/146* (2013.01); *H04L 63/08* (2013.01); *H04W 8/04* (2013.01); *H04W 12/06* (2013.01)

(58) Field of Classification Search
USPC ....... 709/228, 230; 455/404.1; 370/338, 328
See application file for complete search history.

(56) References Cited

U.S. PATENT DOCUMENTS 8,538,383 B2 *  9/2013  Moosavi ................ H04R 27/00
                                                    455/404.1
8,582,563 B2 * 11/2013  Blanco ................ H04L 65/1073
                                                    709/228
(Continued)

FOREIGN PATENT DOCUMENTS

EP        2355455 A1    8/2011
JP     2006515698 A     6/2006
(Continued)

OTHER PUBLICATIONS

CN1; "LS on IMS Identifiers", 3GPP Draft; S3-010585 N1-011768, 3rd Generation Partnership Project (3GPP), Mobile Competence Centre; 650, route des Lucioles; F-06921 Sophia-Antipolis Cedex; France, vol. SA WG3, No. Sophia; Nov. 21, 2001, 2 pgs.
(Continued)

*Primary Examiner* — Quang N Nguyen
(74) *Attorney, Agent, or Firm* — Buchanan Ingersoll & Rooney PC

(57) ABSTRACT

The invention relates, in particular, to a method for registering at least one public address in an IMS network including a terminal that interacts with a security element. According to the invention, the security element includes an application that invites the user of the terminal, upon the occurrence of an event, to enter a public address, selected by the user, via the man/machine interface of the terminal, the application transmitting the public address, accompanied by at least one identifier of the security element, to a remote network via the terminal such that the remote network associates the public address with the identifier.

5 Claims, 2 Drawing Sheets

(51) Int. Cl.
*H04W 8/04* (2009.01)
*H04W 12/06* (2009.01)
*H04L 29/06* (2006.01)

(56) References Cited

U.S. PATENT DOCUMENTS

| | | | |
|---|---|---|---|
| 8,582,589 B2* | 11/2013 | Rautiola | H04W 60/00 370/338 |
| 8,850,036 B2* | 9/2014 | Rozinov | H04L 61/1535 709/228 |
| 2007/0124488 A1* | 5/2007 | Baum | H04L 47/2408 709/230 |
| 2010/0290392 A1* | 11/2010 | Rasanen | H04L 12/14 370/328 |
| 2012/0259986 A1* | 10/2012 | Rozinov | H04L 61/1535 709/227 |
| 2012/0317250 A1 | 12/2012 | Fine | |
| 2015/0120947 A1* | 4/2015 | Guo | H04L 65/1016 709/228 |

FOREIGN PATENT DOCUMENTS

| | | |
|---|---|---|
| JP | 2011523105 A | 8/2011 |
| JP | 2011530921 A | 12/2011 |

OTHER PUBLICATIONS

"3$^{rd}$ Generation Partnership Project; Technical Specification Group Core Network and Terminals; Characteristics of the IP Multimedia Services Identify Module (ISIM) application (Release 10)", 3GPP Standard; 3GPP TS 31.103, 3$^{rd}$ Generation Partnership Project (3GPP), Mobile Competence Centre; 650, Route des Lucioles; F-06921 Sophia-Antipolis Cedex; France, No. V10-1.0, Apr. 2, 2011, pp. 1-43.
International Search Report (PCT/ISA/210) dated Oct. 30, 2013, by the European Patent Office as the International Searching Authority for International Application No. PCT/EP2013/064743.
Notice of Reasons for Rejection issued by the Japanese Patent Office in corresponding Japanese Patent Application No. 2015-521002 with full English translation (6 pages).

* cited by examiner

METHOD FOR REGISTERING AT LEAST ONE PUBLIC ADDRESS IN AN IMS NETWORK, AND CORRESPONDING APPLICATION

The field of the invention is that of telecommunications in data transmission networks. More specifically, the present invention relates to the registering of at least one public address in an IMS (IP Multimedia Subsystem) network.

An IMS network is an IP network connected to an access network. The IMS network provides a dynamic combination of voice, video, messages, data, etc. transmission during the same session. The IMS uses the SIP (Session Initiation Protocol) protocol to establish and control communications or sessions between user terminals (called terminal points) or between terminal points and application servers. The SIP protocol enables a caller to establish a session by packet switching with a person called (using SIP User Agents, UAS, installed in the terminal points), even though the caller does not know the caller's current IP address before making the call.

The current 3GPP IMS specifications require the use of a procedure of user authentication to the IMS network. This procedure is described in 3GPP TS 24.229 and 33.203. Using this approach, the identity of the private user (IMPI) and one or more public identity(ties) of the users (IMPU) are allocated to the user by the operator. To participate in multimedia sessions, the user must register at least one IMPU in the network. The identities are then used by the network to identify the user when registering and the authentication procedure (the IMPI is used to locate the subscribers' information, such as the user authentication data, whereas the allocation model mentions the user identity that the user wants to interact with and which specific services must be linked with). The IMPI and the IMPUs are stored in an application called IMS Subscriber Identity Module (ISIM) conventionally stored in an integrated circuit card (UICC), in the user's terminal.

Each IMPU is associated with a so-called service profile. The service profile is a set of services and related data, which includes, among others, initial filtering criteria which provide a service logic easily accessible to the user (for example, it defines a set of IMS services that the public identity IMPU will be allowed to use).

The network giving access to the IMS network is, for instance an UMTS, LTE, WLAN and/or Internet network.

FIG. 1 shows such an IMS network connected to various access networks.

An IMS network 10, as defined by 3GPP TS 23.228, is connected to application servers 11, 12 by SIP 13, connections. The servers 11 and 12 host IMS applications representing services such as instant messaging, presence management (user present, absent, in a meeting, . . . ), call screening and real-time sessions, such as Voice over IP (VoIP), video conferencing, video on demand, video sharing, network games or television via IP.

Users of the terminal points 15 to 20 access these services of the IMS network via access networks, such as a UMTS network 21, a LTE (Long Term Evolution) 22, a 3GPP2 network 23, a WLAN network 24 or an Internet network 25. The terminal 17 communicates via a wireless connection 26 with the LTE network 22 and an EV-DO link 27 with the 3GPP2 network 23.

The IMS network 28 includes a proxy connected by SIP links 29 to 31 to interconnection gateways, such as a GGSN (Gateway GPRS Support Node) gateway 32 more particularly in charge of providing an IP address to the terminal point 15 including a GPRS terminal throughout its connection to the IMS network, with a PDN GW gateway (Packet Data Network Gateway) 33 providing the same service for the LTE terminals 16 and 17, and a PDSN (Packet Data Serving Node) gateway 34 providing a connection via the 3GPP2 network 23 of the terminal 18 of the CDMA 2000 type.

The access to the services of the IMS network 10 by the users of the terminal points 15 to 20 is obtained when such users are connected to their access networks and have requested an IP connection to the IMS network 10. The terminal points can also communicate with each other via the IMS network, such as VoIP.

The authentication of the terminal points by the IMS network 10 is achieved through their private identities IMPIs, generally contained in a USIM or an ISIM application embedded in each one of the terminal points 15 to 20. Each terminal point therefore has its own private identity IMPI. During the request for access to the IMS network 10, a terminal point submits its IMPI to the network 10 and, if authenticated (in a registration server called HSS—Home Subscriber Subsystem), access rights are granted thereto according to its profile and its subscription. The IMS network shall in particular charge the user and control the session.

Each terminal point 15 to 20 also contains at least one public (i.e. not secret) address IMPU which enables the user to request and receive communications with other users or to access a service. The IMPUs are thus in the form of a SIP URI (Unified Resource Identifier) as defined in the IETF RFC 3261 and IETF RFC recommendations 2396. For example, an IMPU address could be in the following form:

sip: jean-yves@gemalto.com or else as a phone number:

sip: 0123456789@gemalto.ims.com.

On the contrary, the format of an IMPI private address is of the following type:

<xyz>@gemalto.com with <xyz> being a string of any characters, the format of an IMPI being called a Network Access Identifier as described in the IETF RFC 2486 recommendation.

The IMPUs and the IMPI are conventionally stored in the ISIM application of a terminal point. The terminal point may contain software that can save IMPUs or the right to register the IMPUs, i.e. to select the active IMPU at any given moment is left to the user. The user can for example decide that his/her professional IMPU must remain active during his/her working hours and that his/her private IMPU must be active outside these hours.

If the terminal point does not include any ISIM or USIM application, the IMPUs and the IMPI are stored in a memory of the terminal point. In a typical embodiment, the ISIM is stored in a secure element, for example in a UICC smart card which can be removed from the terminal point. A UICC card may include one or more ISIM or USIM application(s). The secure element may also be an integral part of the terminal point.

After or during the authentication of a terminal point by recognition of its IMPI and checking the secrets it contains, the terminal point submits one of its IMPU addresses to the HSS of the IMS network 10 in order to register therein and be able to use an IMS service.

The problem to be solved by the present invention is as follows: when customizing a UICC or a terminal, the end user is not known. Therefore there is no IMPU in the UICC or in the terminal sold to the end user. At best, any (not customized) IMPU is stored in the UICC (e.g. martin1234@gemalto.com). The user of a terminal then usually registers the IMPUs at the point of sale of the terminal in one of the operator's commercial branches. One of the operator's commercial agent with whom the user takes a subscription registers one or more IMPU(s) selected by the end user via an operator terminal. This/these IMPU(s) is/are loaded by an appropriate connection into the UICC or in the terminal (wired connection, OTA, . . . ) and the operator's HSS is informed thereof in parallel.

In practice and as an example, the operator's agent enters an administrative code ADM using the "Verify Pin" command and updates the EF_IMPU file of the UICC using an "Update" command, with the UICC being inserted into a card reader.

The disadvantage of this solution is that the end user needs to go to one of the operator's branches to customize his/her terminal/UICC to register therein one or more IMPU(s) he/she has selected. This also applies if the user wishes to add, delete or modify any of his/her IMPUs when using the terminal.

In addition, the 3GPP TS31.103 standard does not enable a user to update the ISIM in his/her terminal: access to the EF_IMPU file requires a command of the administrative type ("ADM command") that only the operator knows. The end user therefore cannot modify or update himself/herself the contents of the file containing one or more IMPU(s). Reference will advantageously be made to version 10 of the standard published in April 2011, where paragraph 4.2.4 entitled EF_IMPU (IMS public user identity) shows that the "Update", "Deactivate" and "Activate" commands of IMPUs are protected by administrative codes.

The present invention is especially aimed at overcoming this drawback.

More specifically, one object of the invention is to provide a method and an application enabling the user of a terminal including a security element to personally create, edit, activate or deactivate a public address IMPU from his/her terminal without having to go to one of his/her telephone operator's commercial branches.

This objective, as well as others which will become apparent hereinafter, is achieved using a method for registering at least one public address in an IMS network including a terminal that interacts with a security element, with the security element including an application that invites the user of the terminal, upon the occurrence of an event, to enter a public address, selected by the user, via the man-machine interface of the terminal, with the application transmitting the public address accompanied by at least one identifier of the security element to a remote network via the terminal, so that the remote network associates the public address with the identifier.

Preferably, the remote network includes an OTA platform used as an entry point to a HSS of an IMS network.

Advantageously, the method according to the invention consists in transmitting from the remote network to the security element an association acknowledgment message once the public address is associated with the identifier.

In an advantageous embodiment, the invention consists in updating the terminal with the public address after the receiving of said association acknowledgment message by said security element.

Preferably, the identifier of the security element includes at least one of the following identifiers:
the IMSI;
the ICCID;
the IMPI.

The event is for example the first powering on of the terminal.

The invention also relates to an application for registering at least one public address in an IMS network including a terminal that interacts with a security element, with said security element including said application, characterized in that said application prompts the user of said terminal, upon the occurrence of an event, to enter a public address, selected by the user, via the man-machine interface of said terminal, with said application transmitting said public address, accompanied by at least one identifier of said security element, to a remote network via said terminal such that said remote network associates the public address with the identifier.

Other features and advantages of the invention will become apparent upon reading the following description of a preferred embodiment, given in an illustrative and not restrictive example and the appended figures wherein.

Figure 1:
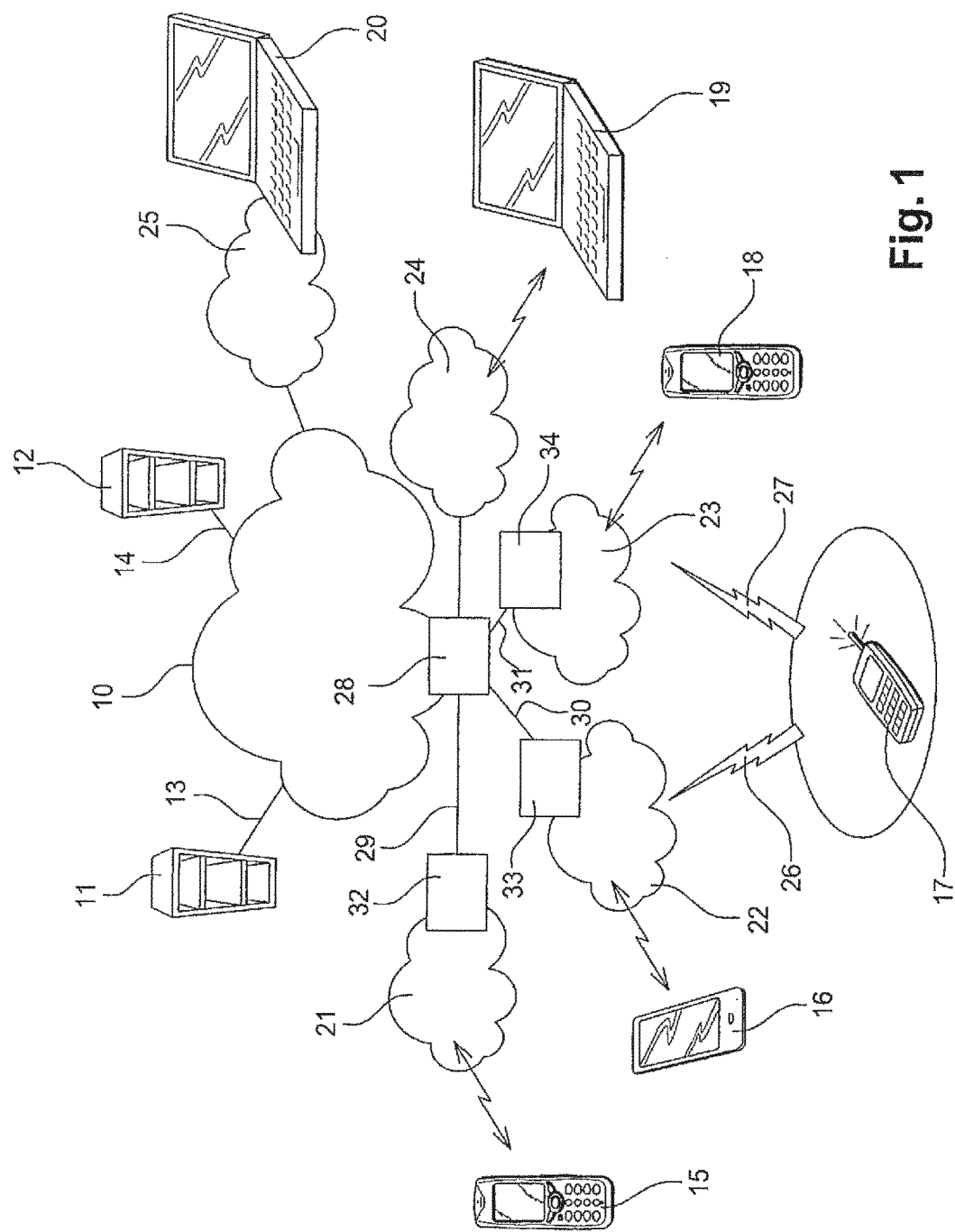
FIG. 1 shows an IMS network connected to various access networks.

FIG. 1 has been described with reference to the prior art.

Figure 2:
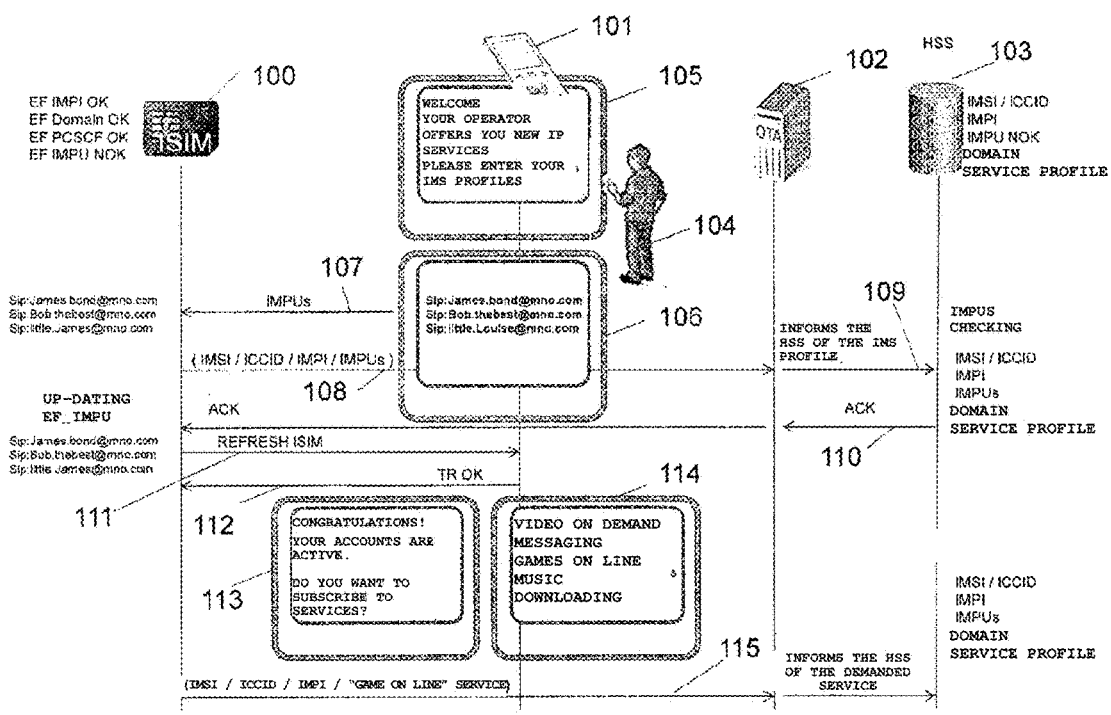
FIG. 2 shows an exemplary implementation of the method according to the invention.

FIG. 2 shows an exemplary implementation of the method according to the invention.

The invention proposes to operate an application (applet) installed in an ISIM within a UICC 100. The UICC 100 is included in a terminal 101, shown here as a mobile phone. The application can also be installed in a chip (eUICC) integral with the terminal 101, with the UICC 100 then not being removable from the terminal 101 as a SIM card can be.

The UICC 100 or eUICC can also communicate by radio (for example Bluetooth or WiFi) with the terminal 101, i.e. it needs not be included in the terminal 101. It may for example be installed in a remote element such as a watch, with the main point being that it communicates with the terminal 101.

The terminal 101 is capable of communicating with a remote network here including an OTA platform 101 and an HSS element 103 of an operator's network. The terminal 101 can communicate with the HSS 103 through the OTA platform 102.

The HSS 103 is particularly used to store, for each network user, information relative to his/her UICC 100. As such, to each UICC is associated an IMSI/ICCID an IMPI, one or more IMPU(s), its IMS domain (the IMS domain enables subscribers to communicate with each other via the IMS services or to access IMS services hosted on service platforms) and a service profile. Prior to the execution of the application according to the invention, the HSS 103 knows the user 104 by his/her IMSI, its ICCID and/or its IMPI, the domain which it belongs to and its service profile. It also knows that no IMPU is associated with these identifiers (IMPU NOK). Similarly, the UICC 100 contains the EF_IMPI, EF_Domain and EF_PCSCF files (the IP address of the proxy giving access to the operator). The UICC 100 also contains the EF_IMPU (EF_IMPU NOK) empty file.

On the occurrence of an event, for example on the first powering on of the terminal 101, upon the powering on of the terminal 101 after downloading the application according to the invention, or upon activation of a function in a menu, or more generally upon request, a greeting message 105 prompts the user 104 of the terminal 101 to enter one or more IMS profile(s), with an IMS profile corresponding to an IMPU address.

The user 104 then enters one or more IMPU(s) of selected by him/her via the man-machine interface of the terminal 101, such as a keyboard. In the example shown, he/she selects the following addresses during a step 106:

Sip: James.bond@mno.com
Sip: Bob.thebest@mno.com
Sip: little.Louise@mno.com

The application submits these public addresses to the ISIM during a step 107 using a STK command. The ISIM temporarily stores these IMPUs in an appropriate directory.

During a step 108, the application submits the IMPUs selected by the user 104 to the OTA platform 102, together with at least one identifier of the UICC. In the given example, three identifiers of the UICC are transmitted with the IMPUs to the OTA platform 102: the IMSI, the ICCID and the IMPI. The OTA platform forwards such identifiers (IMSI/ICCID/IMPI/IMPUs) to the HSS during a step 109. The HSS 103 then checks the IMPUs selected by the user 104. This checking more particularly consists in verifying that the received IMPUs have not already been assigned to another user, having subscribed to the same operator's network or another operator's network. The HSS 103 also associates the IMPUs received with the identifier of the UICC.

If the HSS 103 finds that the received IMPUs are available, it shall inform the UICC thereof by an association acknowledgment message ACK (step 110) once the public address(es) has/have been associated with the identifier or identifiers received. This message is forwarded from the OTA platform 102 to the UICC 100.

The ISIM then updates its EF_IMPU 6F04 file including the user's 104 IMPUs. This update consists in registering therein the IMPUs previously stored temporarily in the aforementioned appropriate directory.

If one of the IMPUs is not available, it also informs the UICC thereof so that it does not take into account the not available IMPU. A message is then displayed to the user to inform him/her of the non-availability of this IMPU, together with an invitation to select another one, if need be.

The application then submits a "Refresh ISIM" command to the terminal 101 (step 111), so that the latter can take the new IMPUs into account. The terminal then acknowledges receipt of these IMPUs during step 112. The registering of the IMPUs can then be validated (executed after step 110).

Optionally, the user 104 may then be invited to subscribe to services (step 113) since he/she now has at least one IMPU address. If the user agrees thereto, a list of services can be proposed to him/her (step 114). Here, four services are offered to the user:

Video on demand
Messaging
Online Games
Music downloading

If the user selects e.g. "Online Games", the HSS 103 receives an order for online games service (step 115), together with at least one identifier of the UICC (here, the IMSI, the ICCID and the IMPI) through the OTA platform 102. The HSS 103 can then contact the UICC 100 using one of the IMPUs associated with the received identifier, using the received identifier.

The invention described above is provided within the scope of the creation of IMPUs, but it may also be applied to the modification of existing IMPUs, as well as to the activation or deactivation of IMPUs, or to the deleting of IMPUs.

The application of the ISIM making it possible to implement the present invention can be saved in the ISIM under the operator's control, for example via the OTA platform 102. The installation thereof in the ISIM is performed under the operator's control and the application includes the PIN and administrative (ADM) rights. The operator has the rights to install the application in the ISIM of the user's UICC (eUICC). The application thus knows the administrative code (ADM) giving access to the HSS and to save one or more IMPU(s) therein.

The invention is therefore based on a trusted application which is an applet installed in a UICC. This applet initiates the dialogue between the OTA platform 102 and the HSS 103 to send the IMPUs selected by the user 104. Further to the agreement from the HSS 103, this applet writes the selected IMPUs into the EF_IMPU file (via an internal interface of the OS and because it was installed with the administrative right ADM).

The invention thus enables a user to create, modify, activate or deactivate one or more IMPU(s) in an IMS network.

The OTA platform 102 which acts in the previous description, as the entry point to a HSS in an IMS network may be substituted with an application server connected to the operator's HSS.

The communications shown in FIG. 2 are preferably of the http type (full IP network such as LTE), but communications of the SMS or SIP types may also be used between the terminal 101 and the OTA platform 102, and even between the platform 102 and the HSS 103. These communications are encrypted by well known means to prevent fraud and guarantee the user's 104 and the network operator's security.

The invention makes it possible to find a way parallel to the existing standard, by enabling the user of a terminal to define IMPUs addresses he/she has selected, without having to go to one of his/her operator's branches.

The invention also relates to an application for registering at least one public address in an IMS network including a terminal that interacts with a security element, with the security element containing this application prompting the user of the terminal, upon the occurrence of an event, to enter a public address, selected by the user, via the man-machine interface of the terminal, with the application transmitting the public address together with at least one identifier of the security element to a remote network via the terminal, so that the remote network associates the public address with the received identifier.

The invention makes it possible for a user of a terminal to avoid having to go to one of his/her telephone operator's branch offices or to connect to an internet service after purchasing the terminal with his/her UICC (eUICC), in order to configure it with his/her IMPU (s).

The operator's HSS is dynamically updated by the end user and the invention meets the standards of the IMS, 3GPP in the ISIM and OTA exchanges ("OTA messaging") and of the supplying of the operator's HSS.

The invention claimed is:

1. A method for registering at least one public address in an IP Multimedia System (IMS) network including a terminal that interacts with a security element, wherein said security element includes an application, said method comprising:

inviting, by the security element, a user of said terminal, upon the occurrence of an event, to enter a public address, selected by the user, via a man-machine interface of said terminal, transmitting, by said application of said security element, said public address accompanied by at least one identifier of said security element to a remote network via said terminal, to enable said remote network to associate said public address with said identifier, and updating, by said application of said security element, said security element with said public address when said remote network sends, to said terminal, a message indicating that said public address is available.

2. The method according to claim 1, wherein said remote network includes an over-the-air (OTA) platform used as an entry point to a home subscriber server (HSS) of an IMS network.

3. The method according to claim 1, wherein said identifier of said security element includes at least one of the following identifiers:

an International Mobile Subscriber Identity (IMSI);
an Integrated Circuit Chip Identity (ICCID);
an IP Multimedia Private Identity (IMPI).

4. The method according to claim 1, wherein said event is the first powering on of said terminal.

5. A security element for registering at least one public address in an IMS network including a terminal that interacts with the security element, said security element including a memory, which stores an application, wherein said application, of said security element, prompts a user of said terminal, upon the occurrence of an event, to enter a public address, selected by the user, via a man-machine interface of said terminal, said application, of said security element, transmits said public address, accompanied by at least one identifier of said security element, to a remote network via said terminal to enable said remote network to associate the public address with said identifier, and said application, of said security element, updates said security element with said public address when said remote network sends, to said terminal, a message indicating that said public address is available.

* * * * *